(12) United States Patent
Chan et al.

(10) Patent No.: US 6,874,158 B2
(45) Date of Patent: Mar. 29, 2005

(54) HOLDER FOR AN OPTICALLY READABLE INFORMATION DISC

(76) Inventors: Chak Sang Simon Chan, 4/F., 53 Tsui Fung Street, Wong Tai Sin, Kowloon (HK); Shek Wah Hau, 6E, Ava Court, 44 Broadcast Drive, Kowloon (HK)

( * ) Notice: Subject to any disclaimer, the term of this patent is extended or adjusted under 35 U.S.C. 154(b) by 193 days.

(21) Appl. No.: 10/128,426

(22) Filed: Apr. 24, 2002

(65) Prior Publication Data

US 2002/0154597 A1 Oct. 24, 2002

(30) Foreign Application Priority Data

Apr. 24, 2001 (HK) .............................. 01102921

(51) Int. Cl.[7] .......................... G11B 7/24; G11B 23/03; G11B 7/0033
(52) U.S. Cl. ...................... 720/720; 720/745
(58) Field of Search ................. 369/289, 290, 369/291, 44.18, 75.2, 77.1

(56) References Cited

U.S. PATENT DOCUMENTS

| | | | |
|---|---|---|---|
| 4,771,890 A | 9/1988 | Hofland et al. | |
| 4,874,085 A | 10/1989 | Grobecker et al. | |
| 4,916,567 A | 4/1990 | Grobecker et al. | |
| 5,502,705 A | 3/1996 | Ahn | |
| 5,559,649 A | 9/1996 | Ito et al. | |
| 5,579,296 A | * 11/1996 | Smith et al. | 369/273 |
| 5,600,628 A | * 2/1997 | Spector | 369/291 |
| 5,610,902 A | 3/1997 | Childers et al. | |
| 5,690,218 A | 11/1997 | McCamy et al. | |
| 5,813,525 A | 9/1998 | McQueeny | |
| 5,984,093 A | 11/1999 | Frick | |
| 5,988,375 A | 11/1999 | Chang | |
| 6,016,298 A | * 1/2000 | Fischer | 369/75.1 |
| 6,178,149 B1 | 1/2001 | Nakamura et al. | |

FOREIGN PATENT DOCUMENTS

| | | |
|---|---|---|
| DE | 19611082 | 8/1996 |
| EP | 0283221 | 9/1993 |
| EP | 0886278 | 12/1998 |
| EP | 1022743 | 7/2000 |
| GB | 2325215 | 11/1998 |
| GB | 2352234 | 1/2001 |
| TW | 414198 | 12/2000 |
| WO | WO 92/06904 | 4/1992 |
| WO | WO 94/14161 | 6/1994 |
| WO | WO 98/11542 | 3/1998 |
| WO | WO 00/65595 | 11/2000 |
| WO | WO 00/68111 | 11/2000 |
| WO | WO 01/1124 | 2/2001 |

* cited by examiner

Primary Examiner—George J. Letscher
(74) Attorney, Agent, or Firm—Burns, Doane, Swecker & Mathis, L.L.P.

(57) ABSTRACT

A holder for holding at least one compact disc includes structure that releasably engages part of a peripheral edge of the disc, such that a continuous, flush, and planar upper surface is formed when the holder is engaged with the disc.

14 Claims, 22 Drawing Sheets

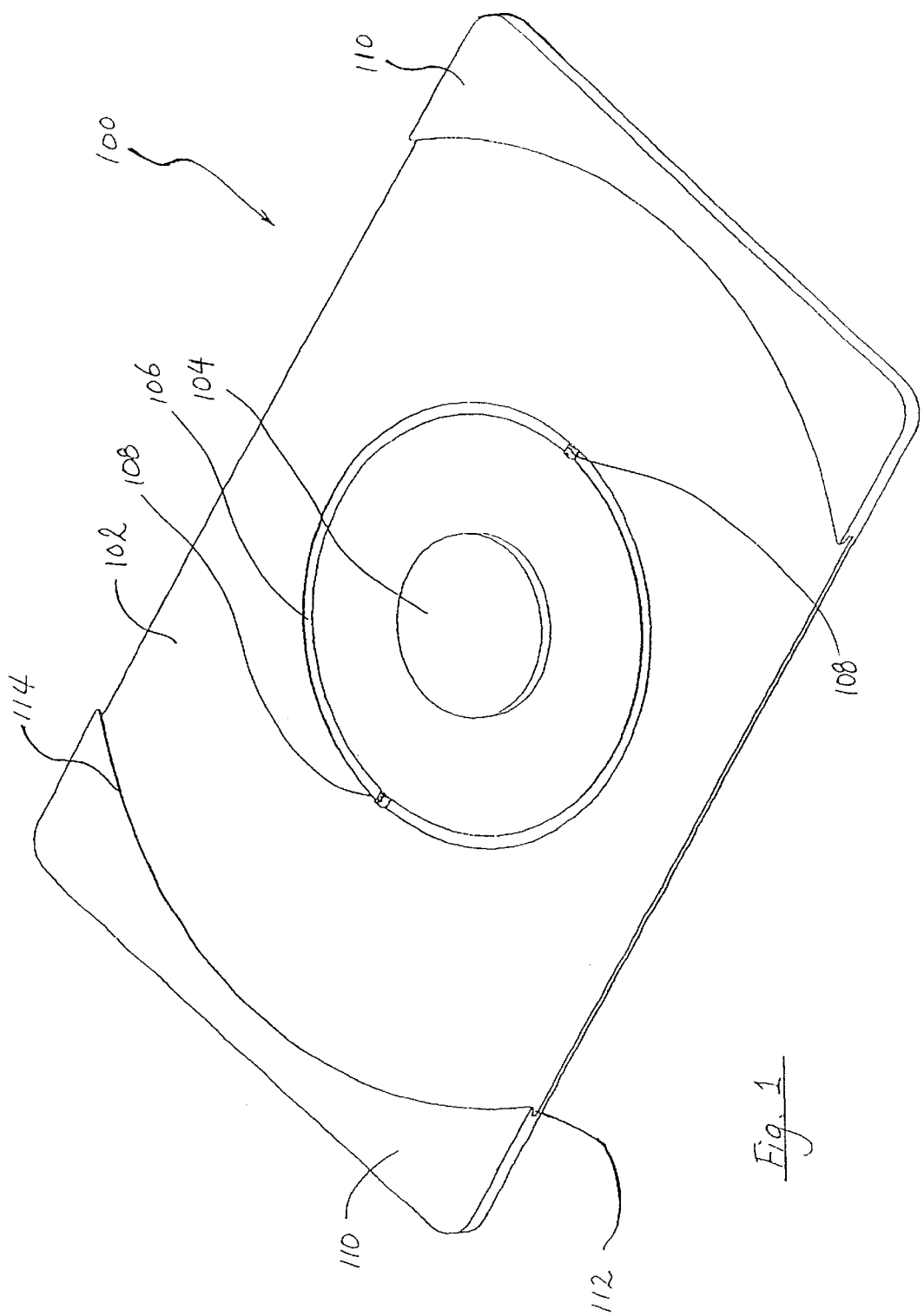

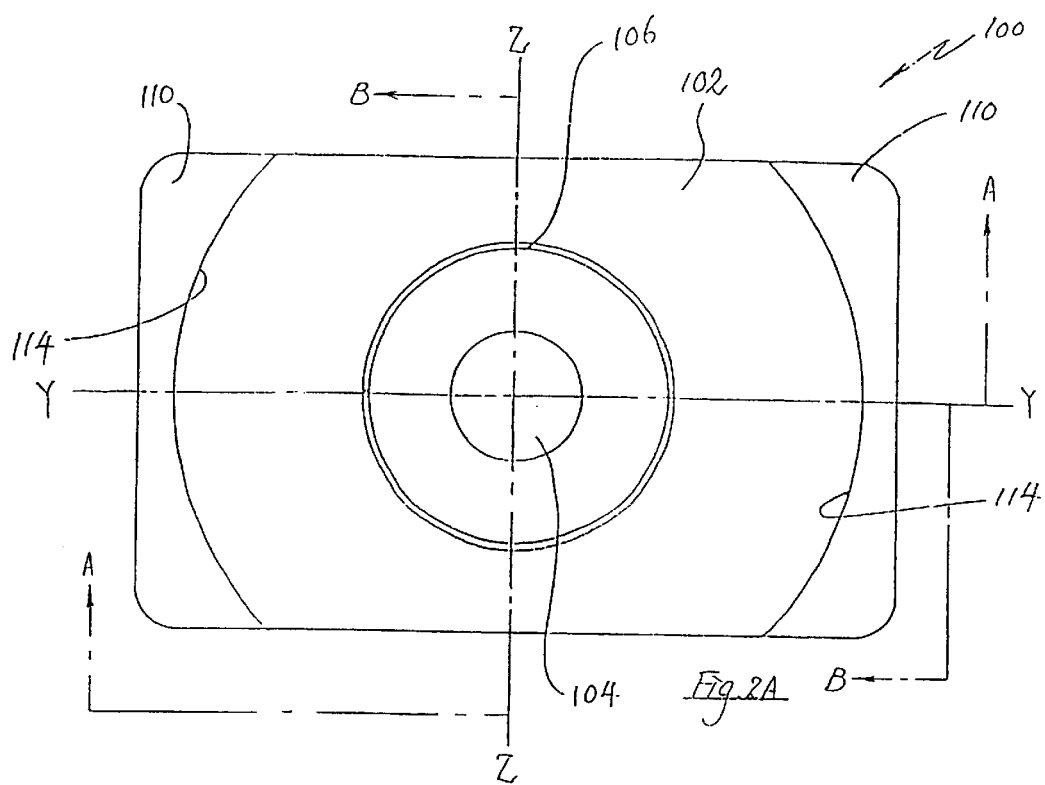
Fig. 2A
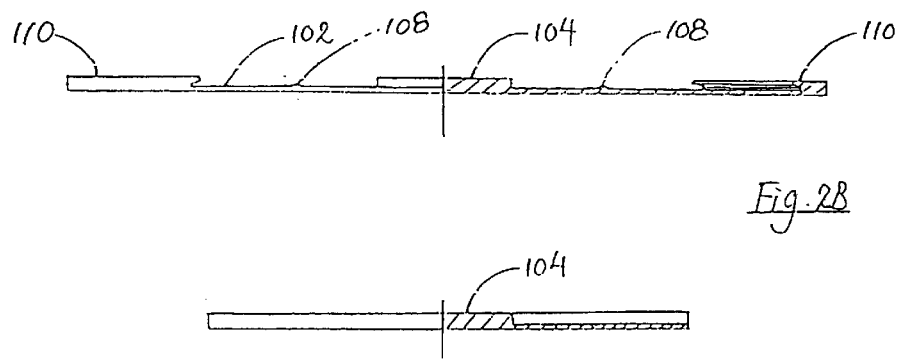
Fig. 2B
Fig. 2C
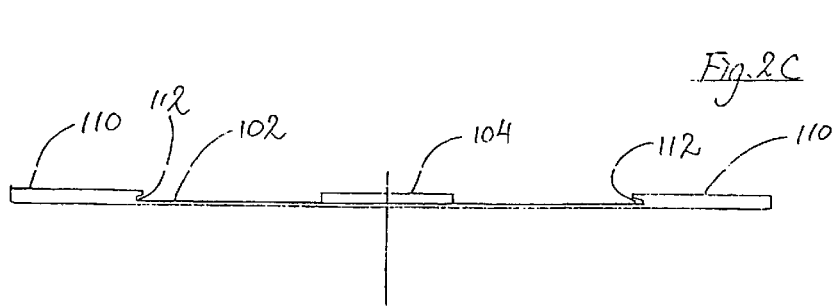
Fig 2D

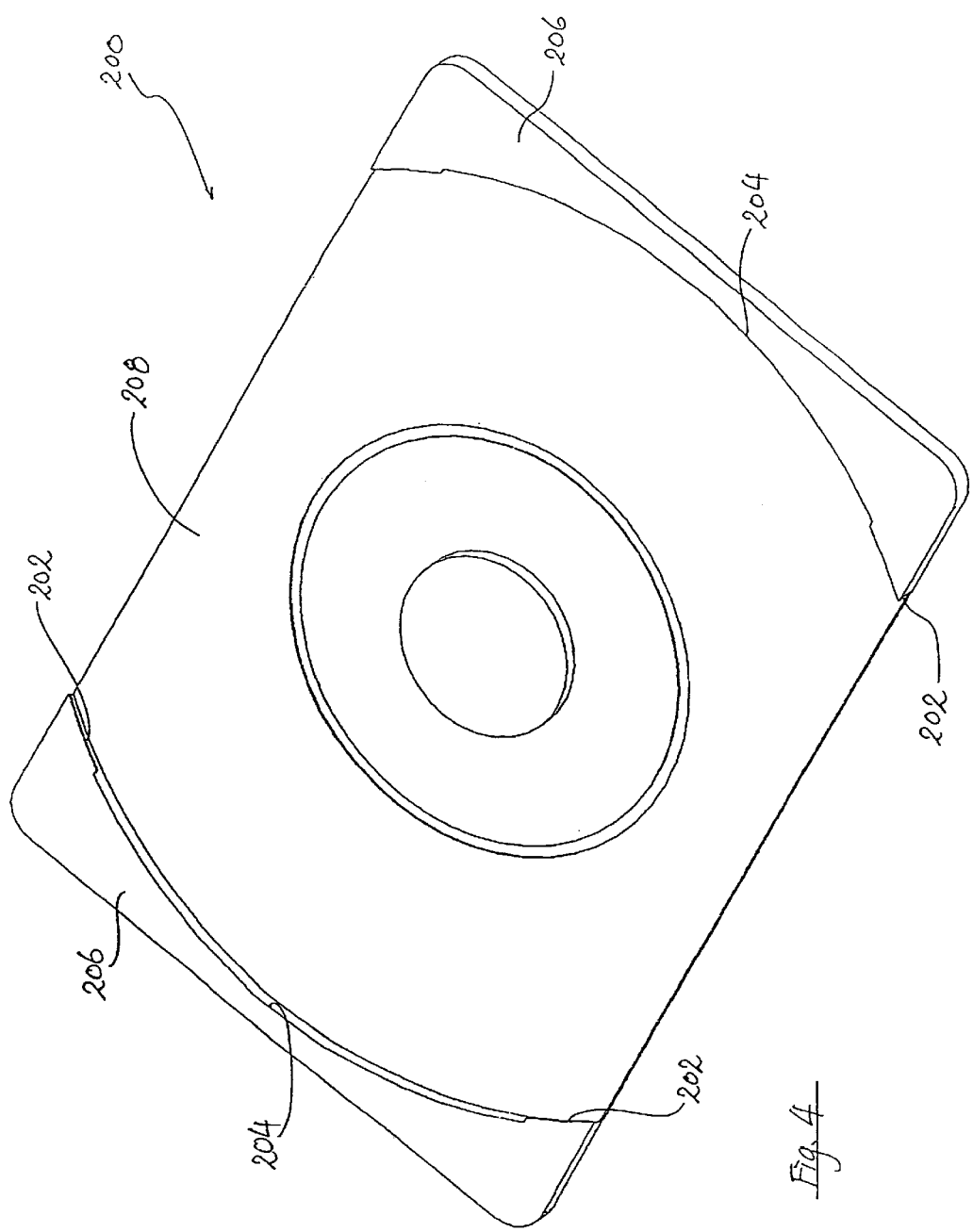

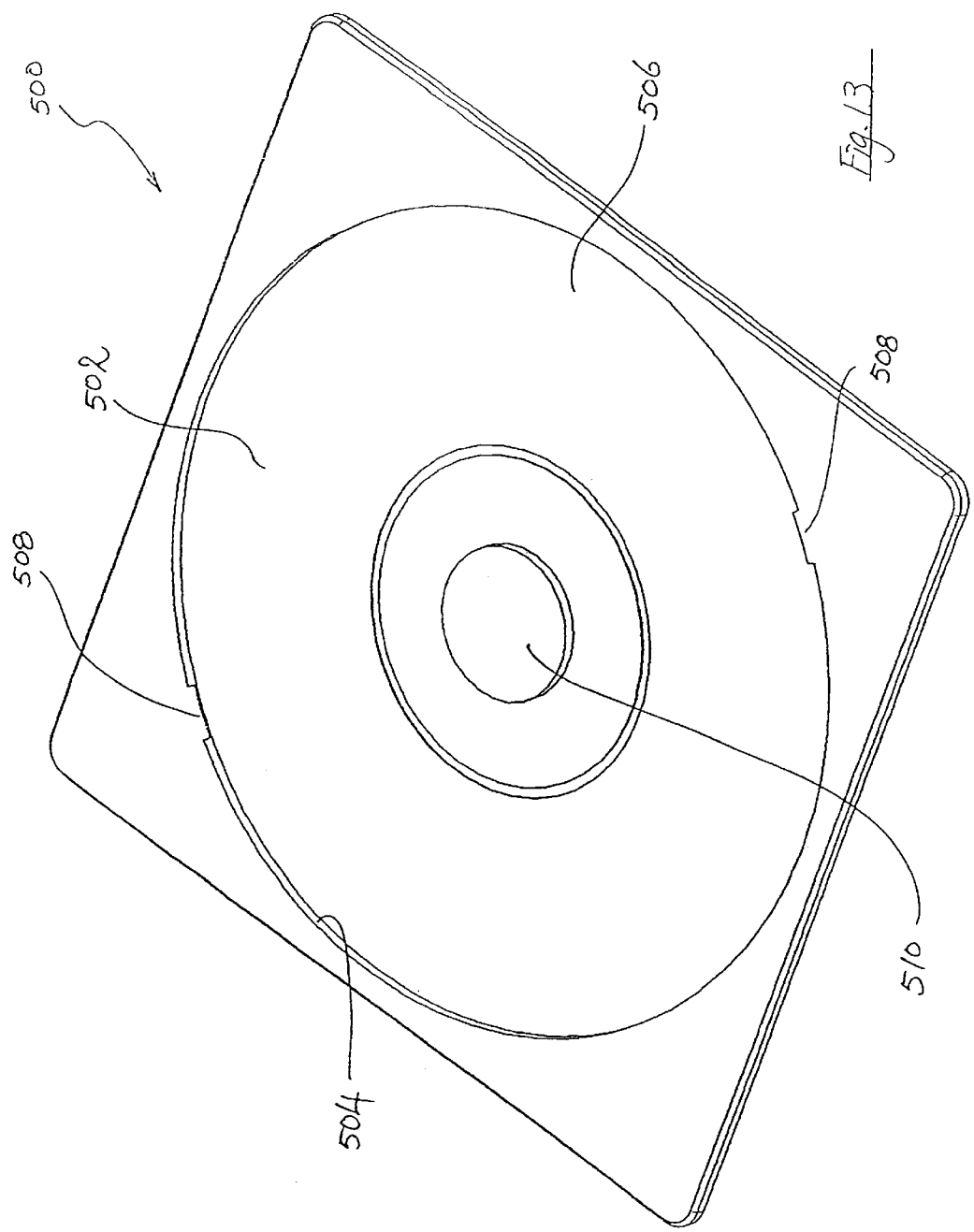

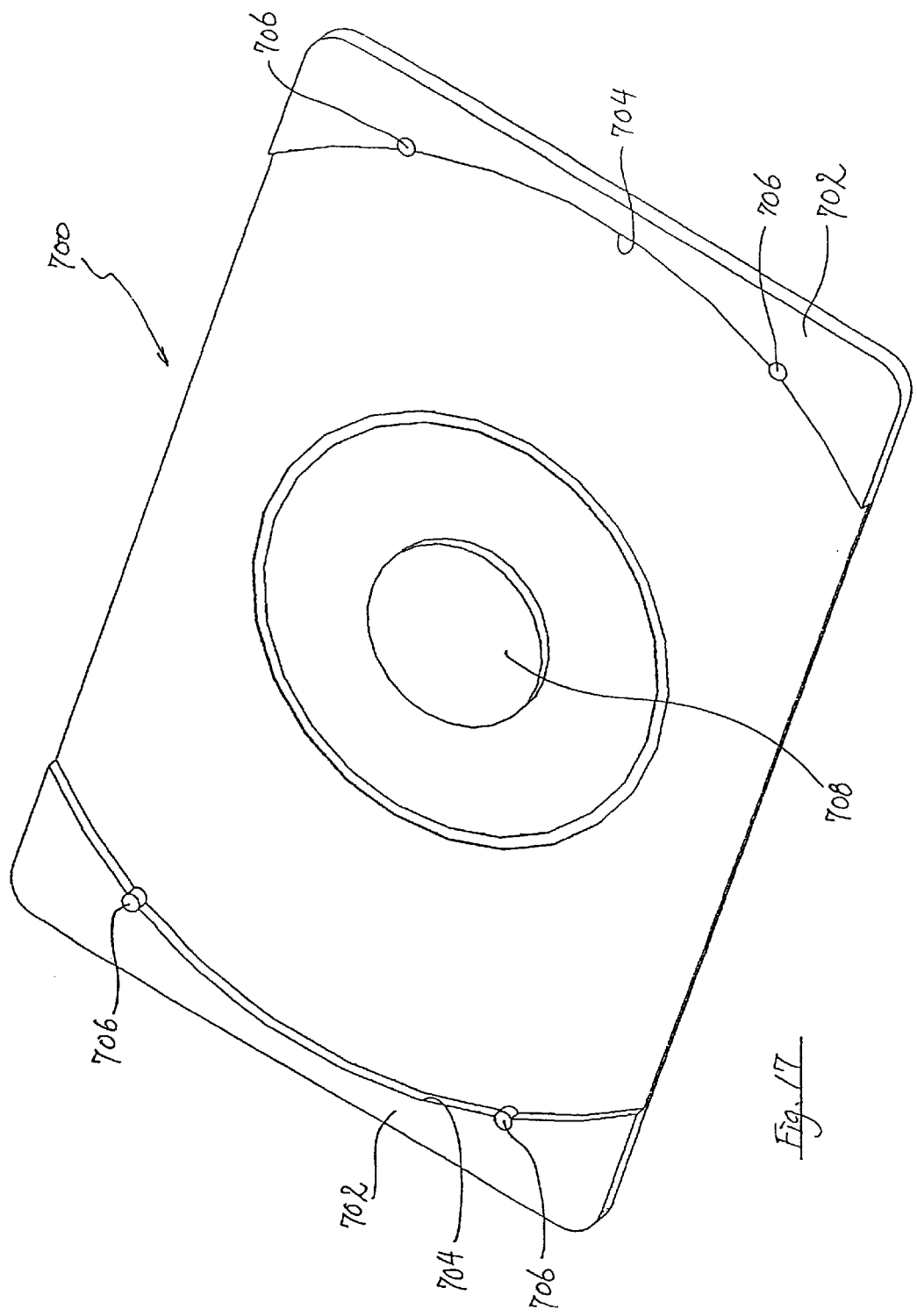

… … …

HOLDER FOR AN OPTICALLY READABLE INFORMATION DISC

This invention relates to a holder for an optically readable information disc, e.g. compact disc (CD), in particular such a holder which is releasably engageable with such a disc.

Since the invention of optically readable information discs in around 1980, see e.g. U.S. Pat. No. 4,410,978 issued to U.S. Philips Corporation, various designs for containers or holders for such discs have been proposed. U.S. Pat. No. 4,874,085 and the equivalent European Patent No. 0 086 484 issued to Polygram GmbH relate to a storage container for disc-shaped information carriers, e.g. CD. The contents of these patent documents are incorporated herein for reference purposes.

The storage container covered by the above patents issued to Polygram GmbH is generally called the "Original Jewel Box" (OJB). The OJB includes a bottom with a central peg arrangement for engaging the inner surface of the central hole of the CD. The central peg arrangement includes a number of resilient members whose exterior sides are adapted to engage the central hole of the CD. A main feature of the OJB is that the central peg arrangement and an elevated rest form a sole means for retaining the CD. In particular, the peripheral edge and the record information area of the CD are free of contact with the container.

Since the OJB, a number of improvements and new designs relating to the central peg arrangement have been made, see, for example, DE 34 25 579 issued to Polygram GmbH, and WO 99/60563. All such new designs seek to enhance the retaining function of the central peg arrangement.

It is an object of the present invention to provide a holder which at least does not solely rely on the engagement between a central peg arrangement and the central hole of the CD. It is also an object of the present invention to provide a useful alternative to the public.

It is also an object of the present invention to provide a holder which, when engaged with a CD, provides a planar upper surface on which graphics and/or text may be provided.

According to the present invention, there is provided a holder for holding at least one optically readable information disc, wherein said holder includes engagement mechanism adapted to releasably engage with at least part of a peripheral edge of said disc, and wherein a continuous, flush, and planar upper surface is adapted to be formed when said holder is engaged with said disc.

Embodiments of the present invention will now be described, by way of examples only, and with reference to the accompanying drawings, in which:

FIG. 1 is a top perspective view of a first embodiment of a holder for an optically readable information disc according to the present invention;

FIG. 2A is a top view of the holder shown in FIG. 1;

FIG. 2B is a sectional view taken along the line A—A in FIG. 2A;

FIG. 2C is a sectional view taken along the line B—B in FIG. 2A;

FIG. 2D is a side view of the holder shown in FIG. 2A;

FIG. 4 is a top perspective view of a second embodiment of a holder for an optically readable information disc according to the present invention;

FIG. 13 is a top perspective view of a fifth embodiment of a holder for an optically readable information disc according to the present invention;

FIG. 17 is a top perspective view of a seventh embodiment of a holder for an optically readable information disc according to the present invention.

Figure 3A:
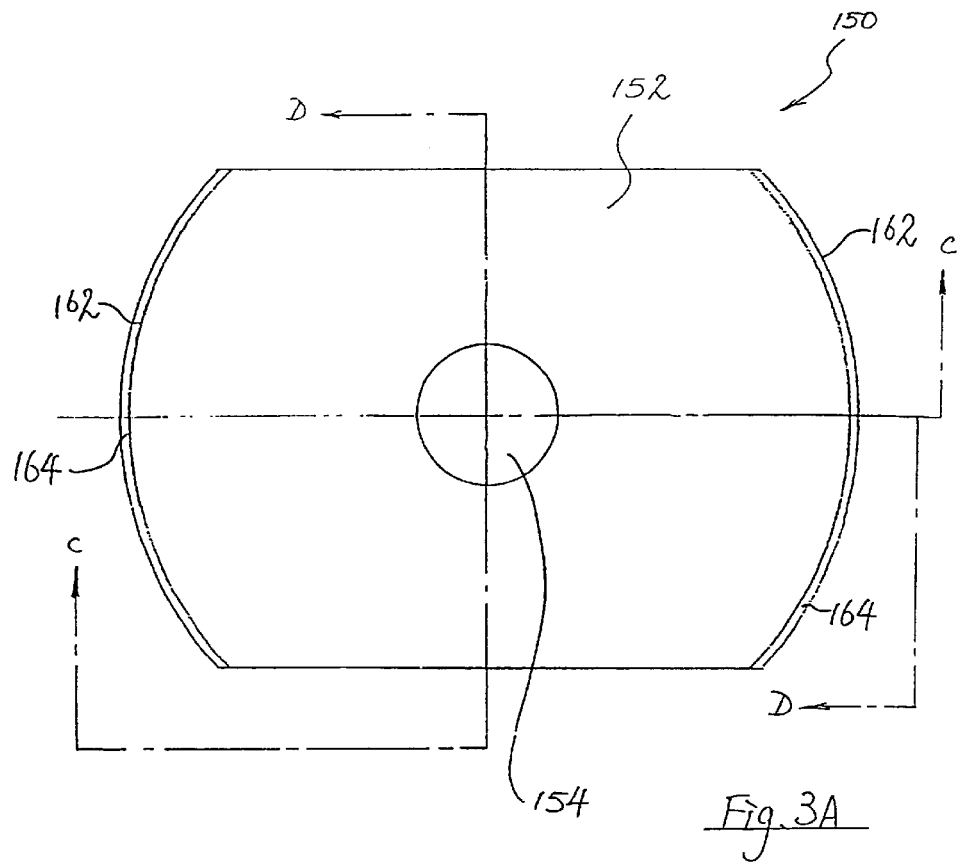
FIG. 3A is a top view of a CD engageable with the holder shown in FIG. 1.
Figure 3B:
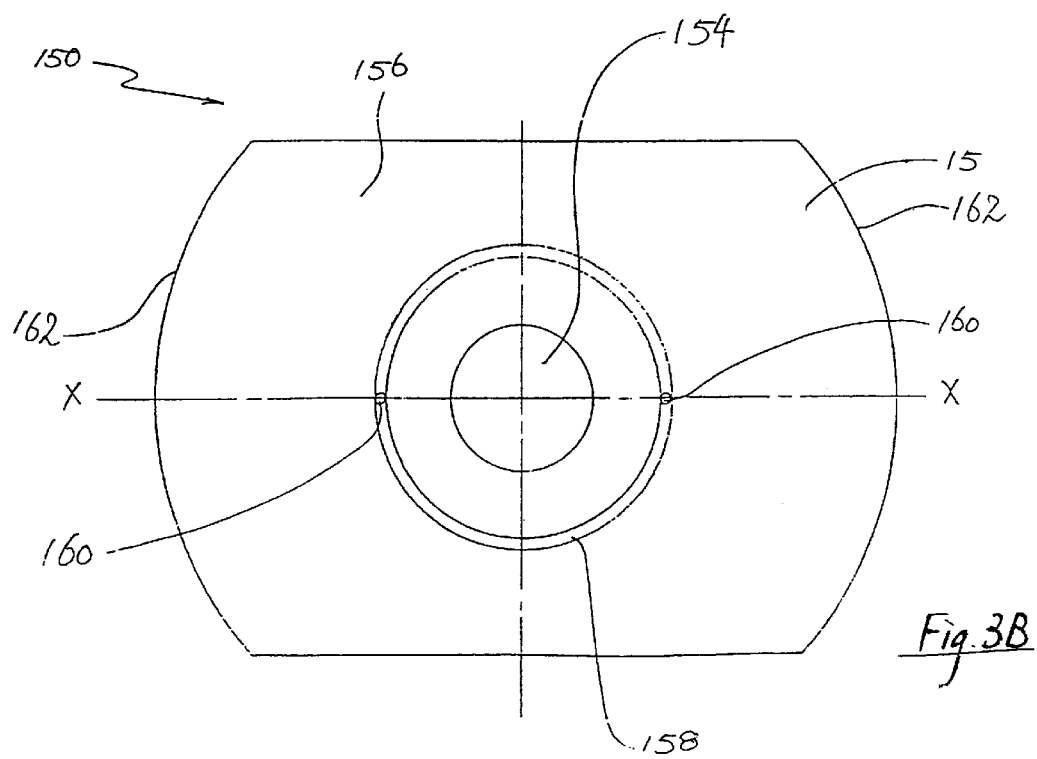
FIG. 3B is a bottom view of the CD shown in FIG. 3A.
Figure 3C:
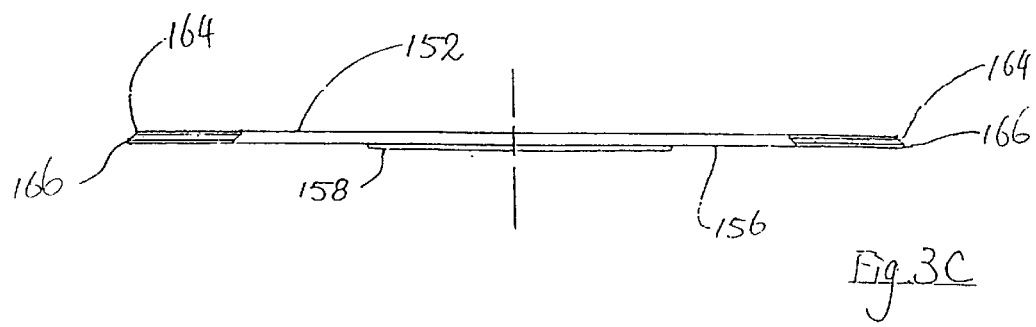
FIG. 3C is a side view of the CD shown in FIG. 3A.
Figure 3D:
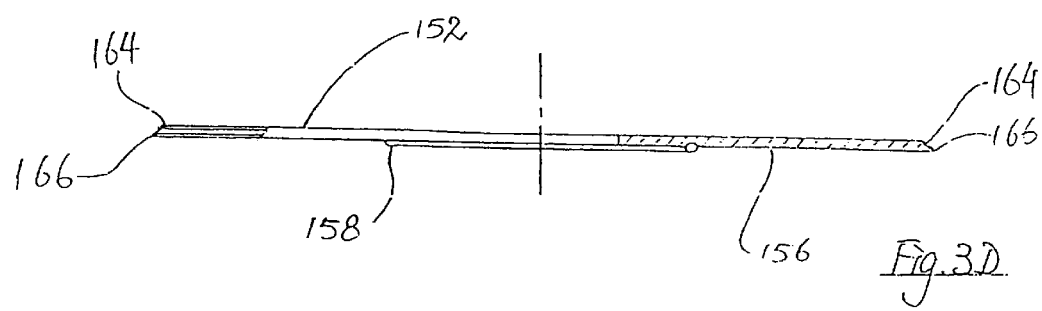
FIG. 3D is a sectional view taken along the line C—C in FIG. 3A.
Figure 3E:
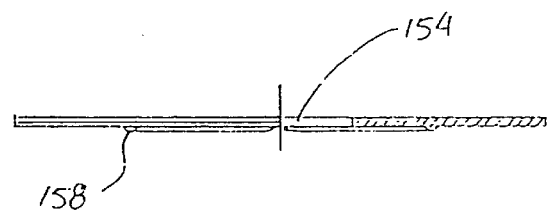
FIG. 3F is a view showing the way in which the holder shown in FIG. 1 and the CD shown in FIG. 3A are engaged with each other.
FIG. 3G shows the way of engagement and disengagement between the holder shown in FIG. 1 and the CD shown in FIG. 3A.

Referring firstly to FIGS. 1 to 2D, such show a first embodiment of a holder for an optically readable information disc according to the present invention, and generally designated as 100. While the holder for an optically readable information disc according to the present invention will henceforth be discussed in the context of a CD holder, it should be understood that the holder can be used for holding other optically readable information discs, e.g. DVDs. Similarly, while the optically readable information disc is here described by reference to a CD, it should be understood that such may be other forms of optically readable information discs, e.g. DVDs. It should also be understood that, in the context of the present invention, the disc is not limited to circular in shape only, but may be of other suitable shapes, as discussed below and illustrated in the accompanying drawings.

The CD holder 100 is generally rectangular in shape, and has a generally planar base surface 102. At the centre portion of the base surface 102 is a rigid peg 104. It can be seen that the peg 104 is in the shape of a very short cylinder. The peg 104 is sized to be slightly smaller than the central hole of a CD with which it is to be engaged (to be discussed below), so that the peg 104 may be received within the central hole of the CD. However, the peg 104 does not have any positive engagement with the central hole of the CD, and thus the CD.

Surrounding the peg 104 is a circular gutter, or trough, 106. Two upwardly protruding nipples 108 are provided on the gutter 106 and diametrically opposed to each other. Both these nipples 108 are raised above the planar base surface 102 of the holder 100. The function of the gutter 106 and the nipples 108 will be discussed below.

At each longitudinal end of the holder 100 is a raised platform 110. Formed between each of the platforms 110 and the planar surface 102 is an under-cut recessed portion 112. These recessed portions 112 follow the generally curved inner side 114 of each of the raised platform 110.

A CD suitable for being held by the holder 100 is shown in FIGS. 3A to 3E, and generally designated as 150. The CD 150 is in the general form of a card. On an upper side 152 of the CD 150 may be provided with graphics and/or text material. A hole 154 is provided at the centre region of the CD 150. As discussed above, the peg 104 of the holder 100 is sized for the hole 154. An underside 156 of the CD 150 are provided with a series of data tracks which may be illuminated and read by a source of coherent light, e.g. a laser. On the underside 156 of the CD 150 is also provided with a stacking ring 158 which, when the CD 150 is engaged with the holder 100, is received within the gutter 106. Two small recesses 160 are provided on the stacking ring 158 and positioned diametrically opposite to each other.

Figure 3F:
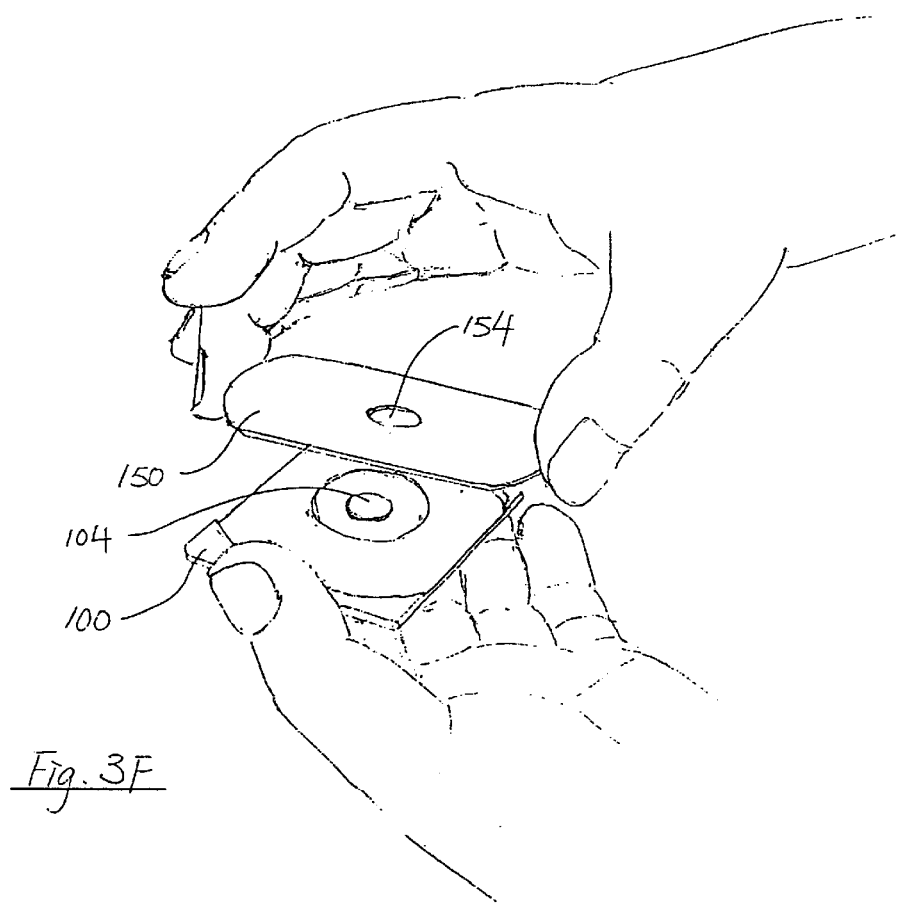
Figure 3G:
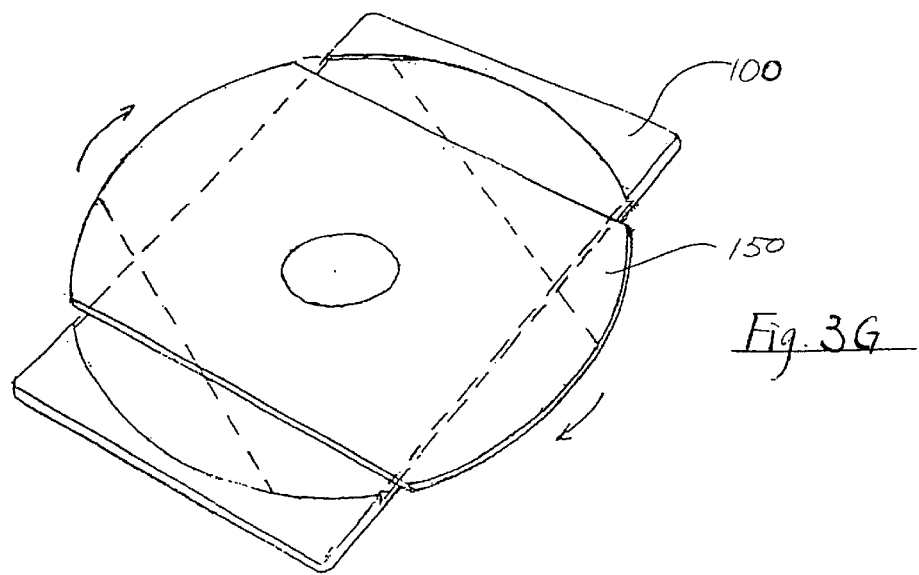

Along each curved longitudinal end 162 of the CD 150 is a continuous strip of stepped or chamfered portion 164, which allows the CD 150 to be retained by the holder 100. In particular, in order to engage the CD 150 with the holder 100, and as shown in FIGS. 3F and 3G, it is first necessary to have the peg 104 of the holder 100 received within the hole 154 of the CD, with the underside 156 of the CD 150 facing the planar surface 102, and with the major axis X—X of the CD 150 (see FIG. 3B) positioned generally parallel to the minor axis Z—Z of the holder 100. In this position, the CD 150 may be rotated relative to the holder 100 in the direction indicated by the arrows in FIG. 3G, so that a lower stepped portion 166 enters into and is received within the recessed portion 112 of the holder 100.

When the lower stepped portion 166 is fully received within the recessed portion 112 of the holder 100, the major axis X—X of the CD 150 will then be parallel to the major axis Y—Y of the holder 100, and the nipples 108 of the gutter 106 of the holder 100 will be engaged with the recesses 160 on the stacking ring 158 of the CD 150. Both the engagement between the lower stepped portion 166 and the recessed portion 112, and the engagement between the nipples 108 and the recesses 160 will assist in holding and retaining the CD 150 to the holder 100. In this connection, it should be understood that the nipples 108 need not be diametrically opposed to each other, provided that they are appropriately positioned to engage with two recesses of the CD 150.

If the CD 150 is to be released from the holder 100, the CD 150 is to be rotated relative to the holder 100 until the lower stepped portions 166 are clear of the recessed portions 112. In this position, the major axis X—X of the CD 150 will be generally parallel to the minor axis Z—Z of the holder 100. The CD 150 and the holder 100 may then be disengaged from each other.

It should be noted that, the CD 150 is of a thickness such that, when the CD 150 and the holder 100 are engaged with each other, the upper surface 152 of the CD 150 is flush with the platforms 110, so that a continuous, flush, and planar upper surface is formed. It is thus possible to have graphics and/or text provided, e.g. printed, on the continuous planar upper surface so formed. Such a feature cannot be provided by existing CD holder, since the central peg arrangements so far provided have to be movable, thus there must be a space on the upper end of the peg arrangements. However, in the present invention, the peg 104 has a planar upper surface, which allows a continuous upper surface of the combined CD holder 100 and CD 150 to be formed.

Figure 5A:
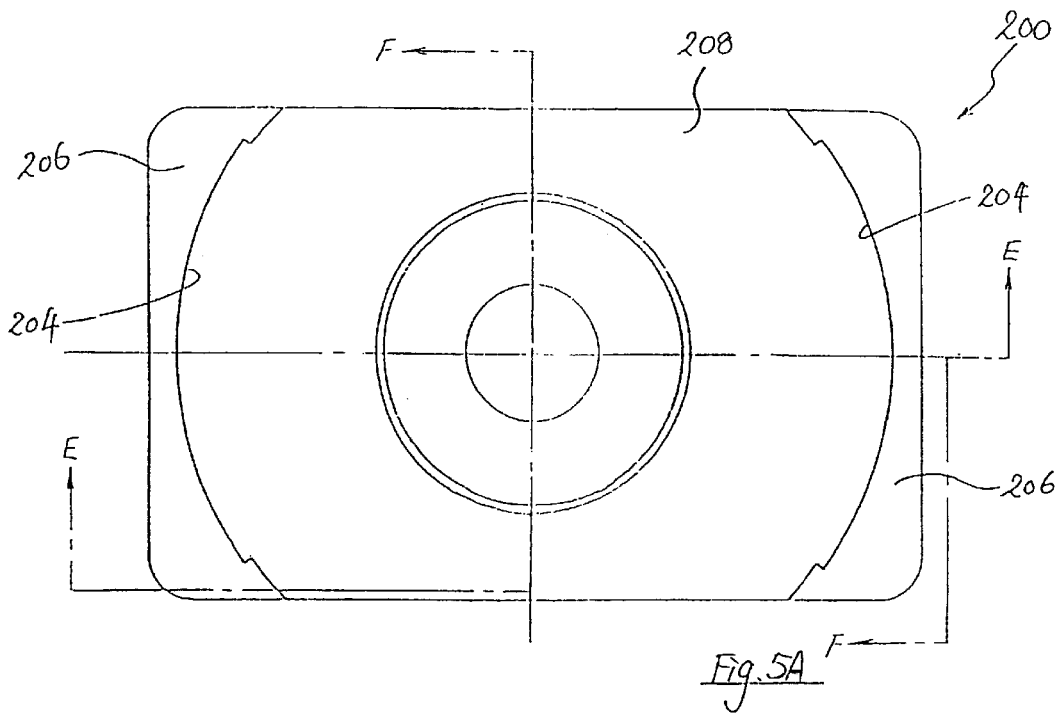
FIG. 5A is a top view of the CD holder shown in FIG. 4.
Figure 5B:
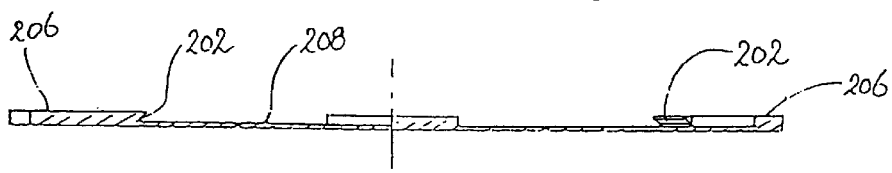
FIG. 5B is a sectional view taken along the line E—E in FIG. 5A.
Figure 5C:
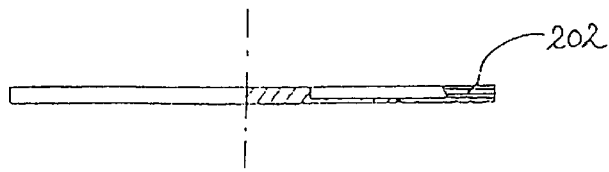
FIG. 5C is a sectional view taken along the line F—F of FIG. 5A.
Figure 5D:
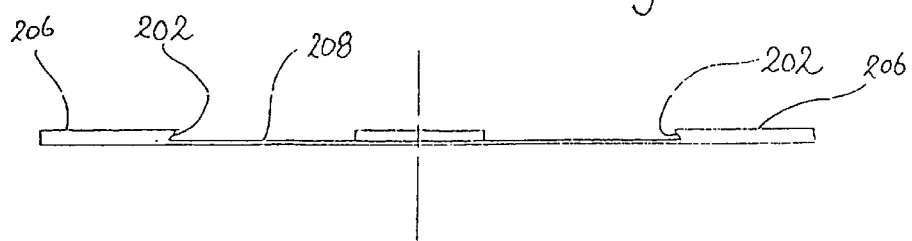
FIG. 5D is a side view of the CD holder shown in FIG. 5A.
Figure 6A:
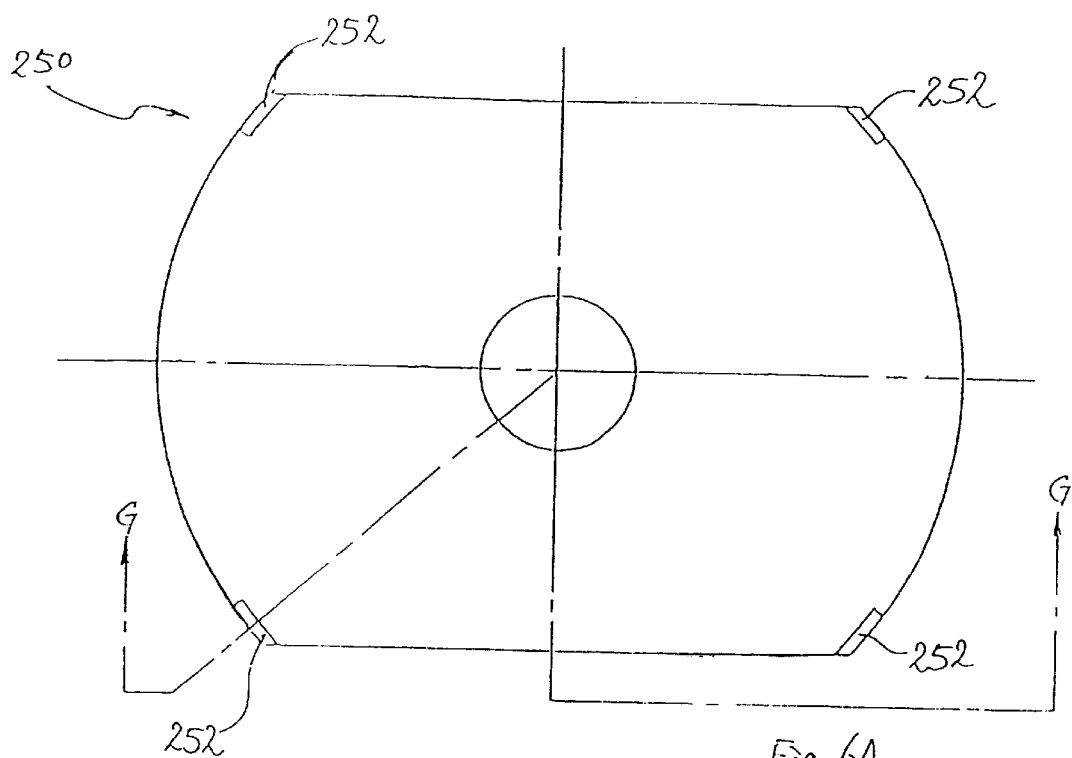
FIG. 6A is a top view of a CD engageable with the CD holder shown in FIG. 4.
Figure 6B:
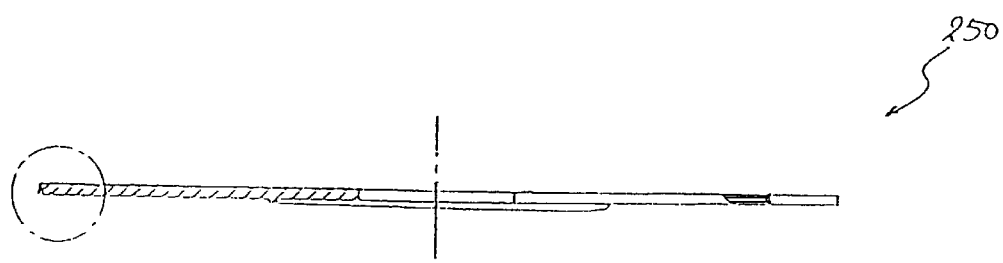
FIG. 6B is a sectional view taken along the line G—G in FIG. 6A.
Figure 6C:
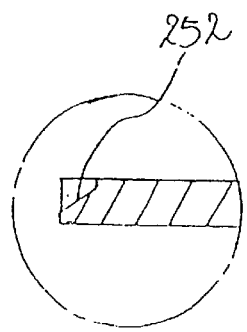
FIG. 6C is an enlarged view of the part encircled in FIG. 6B.
Figure 6D:
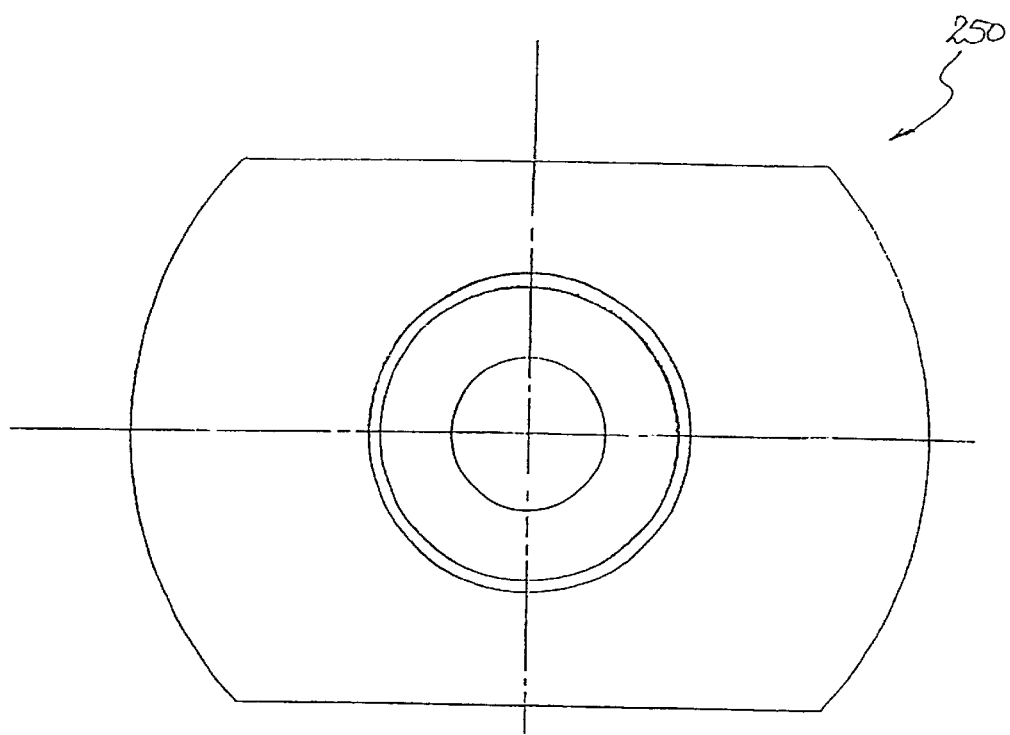
FIG. 6D is a bottom view of the CD shown in FIG. 6A.

A second embodiment of a holder according to the present invention is shown in FIGS. 4 to 5D, and generally designated as 200. The general construction and shape of the holder 200 is similar to that of the holder 100, except that, instead of having two continuous curved under-cut recessed portions 112 in the holder 100, the holder 200 has two pairs of chamfered under-cut recessed portions 202. Each of the two pairs of recessed portions 202 is provided at two ends of a curved inner edge 204 of a respective raised platform 206. While each of the recessed portions 202 has a surface which is inwardly inclined relative to a planar surface 208, the rest of the inner edge 204 of the raised platform 206 has a surface which is perpendicular relative to the planar surface 208.

A CD suitable for engagement with the holder 200 is shown in FIGS. 6A to 6D, and generally designated as 250. It can be seen that this CD 250 is similar to the CD 150 shown in FIGS. 3A to 3E. However, instead of having two stripes of curved continuous stepped portions, as in the case of the CD 150, the CD 250 has four chamfered portions 252, each provided at a corner of the CD 250. These chamfered portions 252 may be received within the under-cut recessed portions 202 of the holder 200.

As in the engagement between the holder 100 and the CD 150, the chamfered portions 252 of the CD 250 may be slid into or out of the recessed portions 202 in order to engage the CD 250 with, or disengage the CD 250 from, the holder 200. In addition, because of the inherent resilience of the CD 250, it is also possible to engage the CD 250 with, or disengage the CD 250 from, the holder 200 by snapping each of the chamfered portions 252 into or out of a respective recessed portion 202 of the holder.

Figure 7:
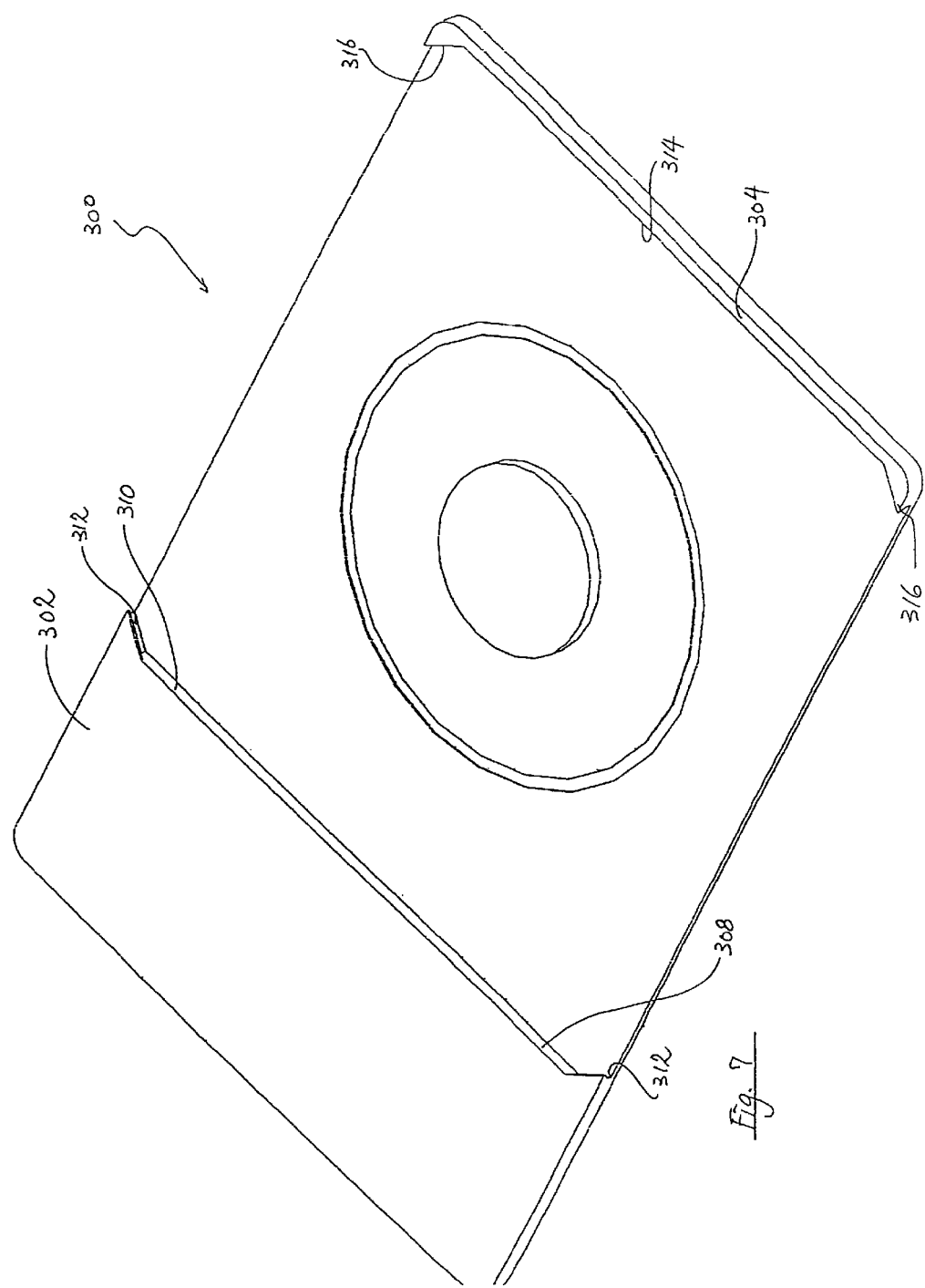
FIG. 7 is a top perspective view of a third embodiment of a holder for an optically readable information disc according to the present invention.
Figure 8A:
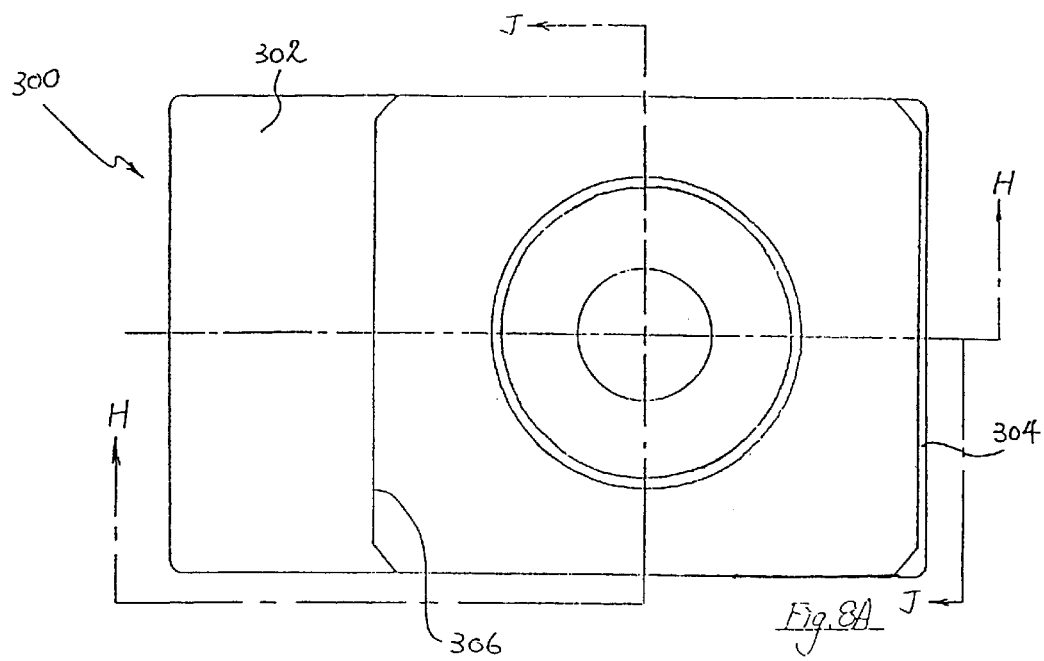
FIG. 8A is a top view of the CD holder shown in FIG. 7.
Figure 8B:
FIG. 8B is a sectional view taken along the line H—H in FIG. 8A.
Figure 8C:
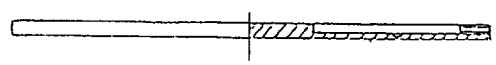
FIG. 8C is a sectional view taken along the line J—J in FIG. 8A.
Figure 9A:
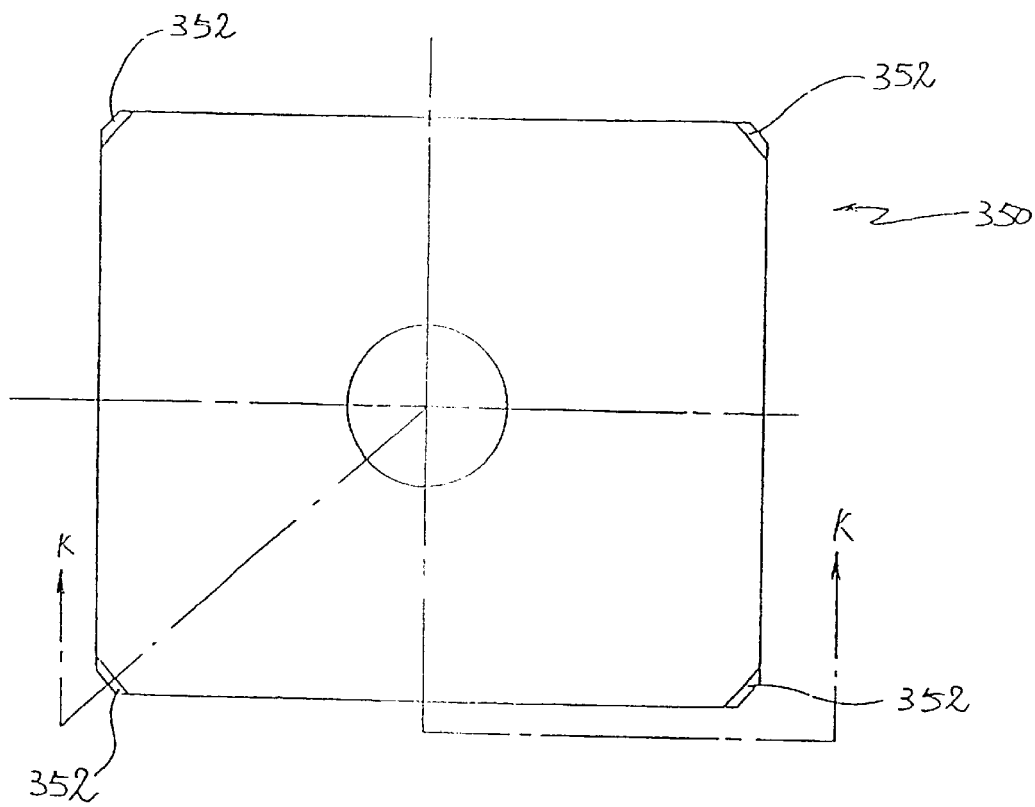
FIG. 9A is a top view of a CD engageable with the CD holder shown in FIG. 7.
Figure 9B:
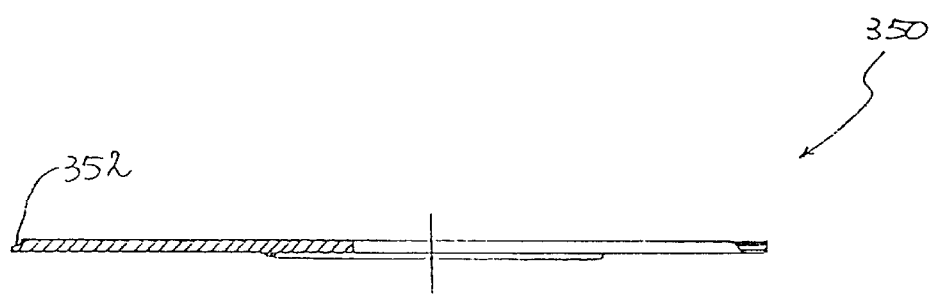
FIG. 9B is a sectional view taken along the line K—K in FIG. 9A.
Figure 9C:
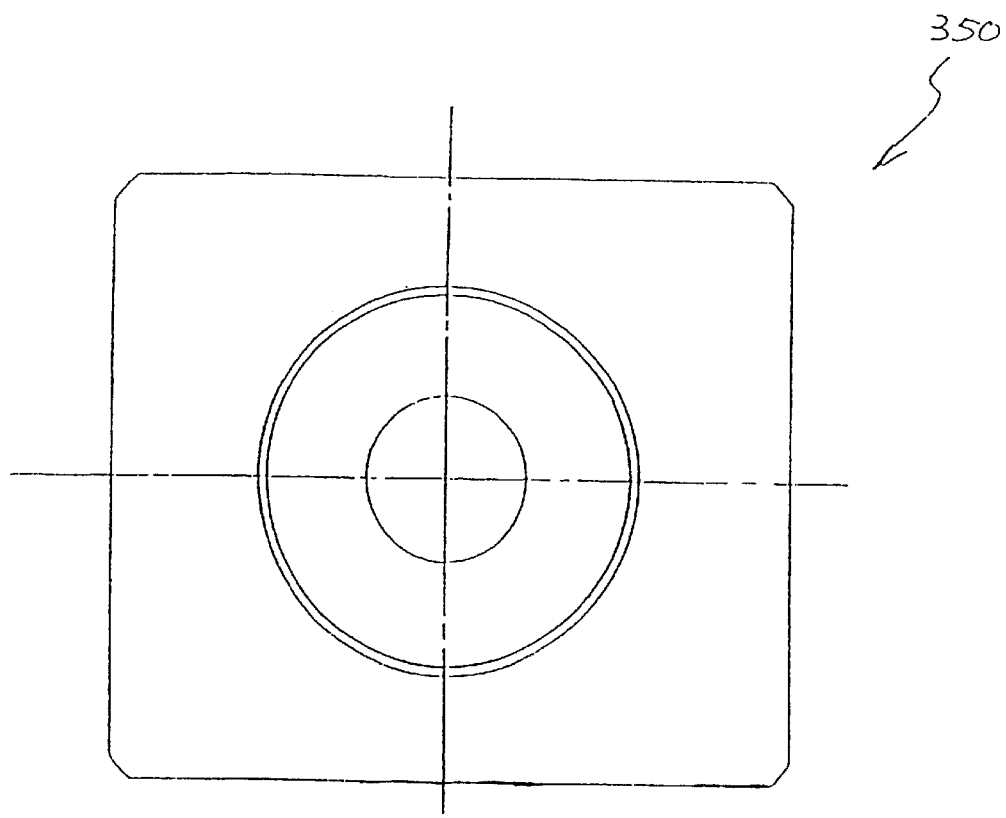
FIG. 9C is a bottom view of the CD shown in FIG. 9A.
Figure 9D:
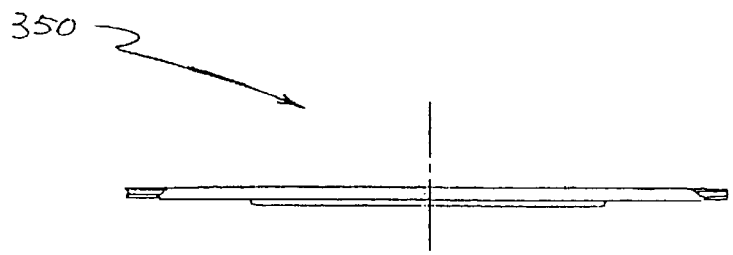
FIG. 9D is a right side view of the CD shown in FIG. 9A.

A third embodiment of a holder according to the present invention is shown in FIGS. 7 to 8D, and generally designated as 300. The holder 300 is generally rectangular in shape, with a wider raised platform 302 at one longitudinal end, and a narrower raised platform 304 at another longitudinal end. The inner side 306 of the platform 302 has a straight edge 308 with a surface which is perpendicular to a planar surface 310 of the holder 300. At each end of the straight edge 308 is an under-cut recessed portion 312. Each of the recessed portions has a surface which is inwardly inclined relative to the planar surface 310. The inner side of the platform 304 also has a straight edge 314 with a planar surface which is perpendicular to the planar surface 310. At each end of the straight edge 314 is an under-cut recessed portion 316, each with a surface which is inwardly inclined relative to the planar surface 310. In this arrangement, the size and shape of the recessed portions 312 and 316 are the same.

A CD suitable for engagement with the holder 300 is shown in FIGS. 9A to 9D, and generally designated as 350. The CD 350 is generally rectangular in shape, and with a central hole, as in conventional arrangement. At each corner of the CD 350 is a chamfered portion 352 which is sized and shaped to be fitted within an under-cut recessed portion 312 or 316 of the holder 300.

To engage the CD 350 with the holder 300, two adjoining chamfered portions 352 are inserted within the recessed portions 312. The remaining chamfered portions 352 are then snap-fitted into the recessed portions 316. In order to disengage the CD 350 from the holder 300, the two chamfered portions 352 received within the recessed portions 316 are snapped out engagement with the recessed portions 316. The CD 350 may then be removed from the holder 300.

Figure 10:
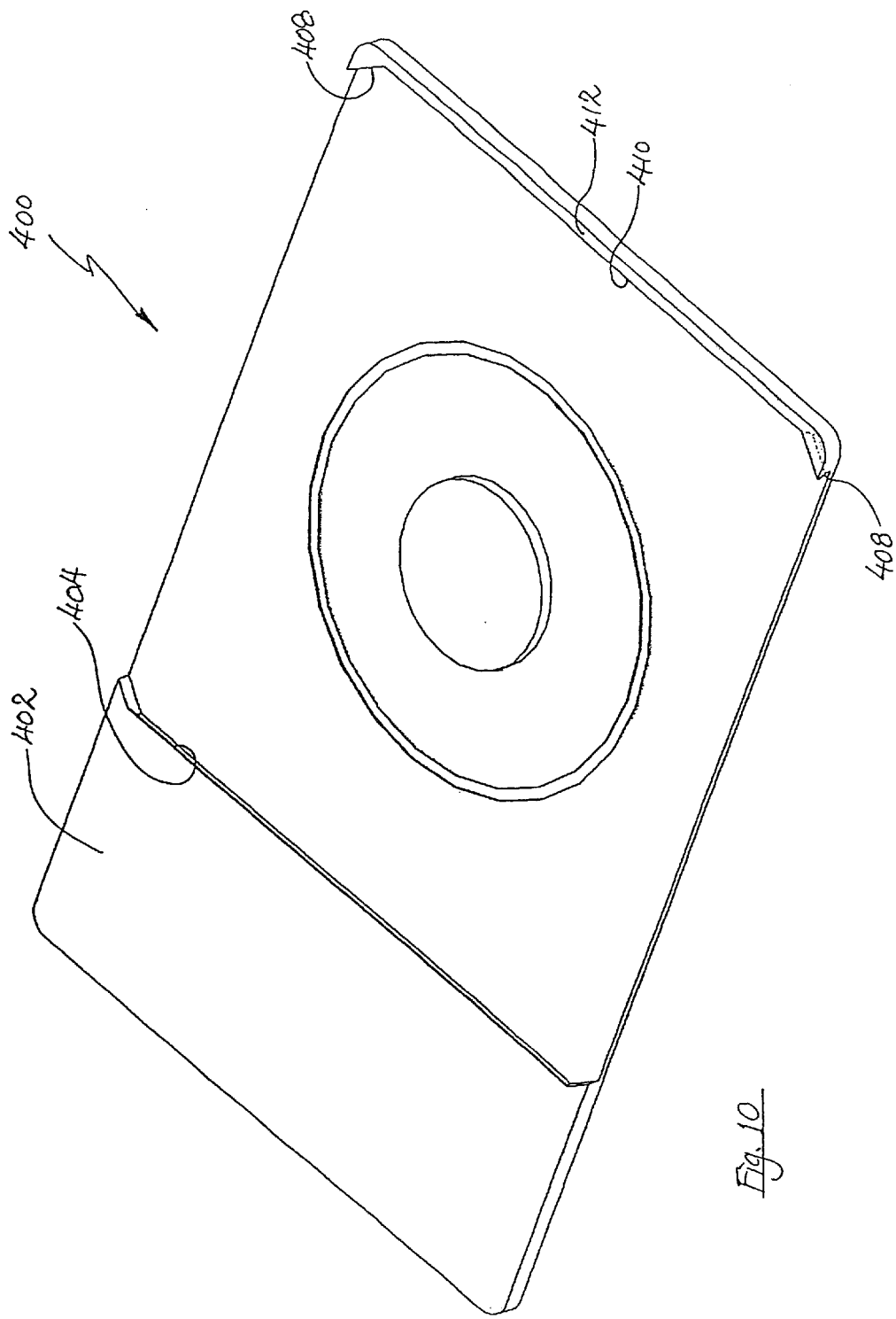
FIG. 10 is a top perspective view of a fourth embodiment of a holder for an optically readable information disc according to the present invention.
Figure 11A:
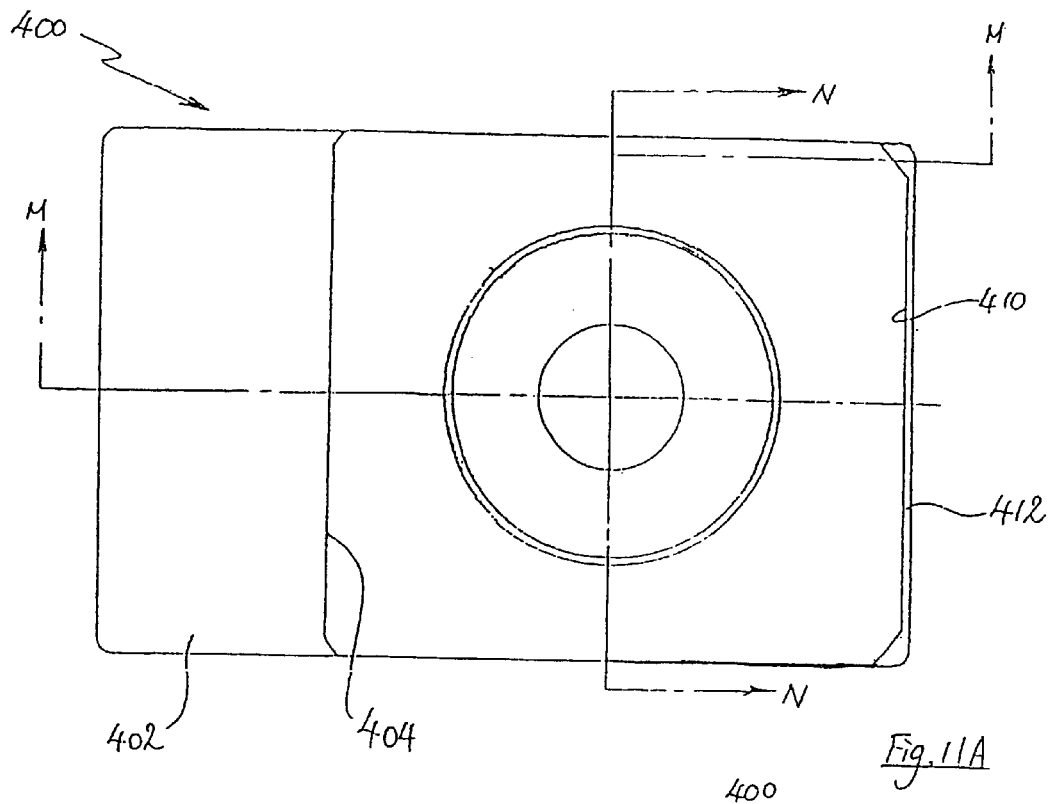
FIG. 11A is a top view of the CD holder shown in FIG. 10.
Figure 11B:
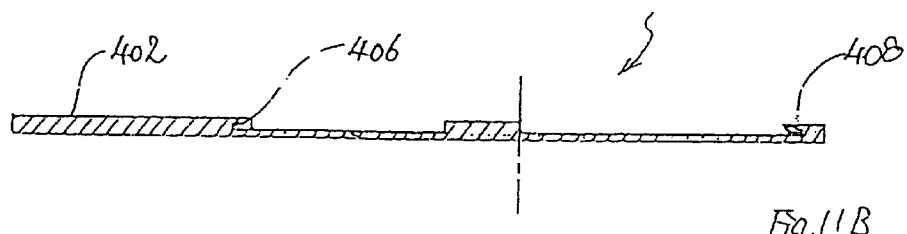
FIG. 11B is a sectional view taken along the line M—M in FIG. 11A.
Figure 11C:
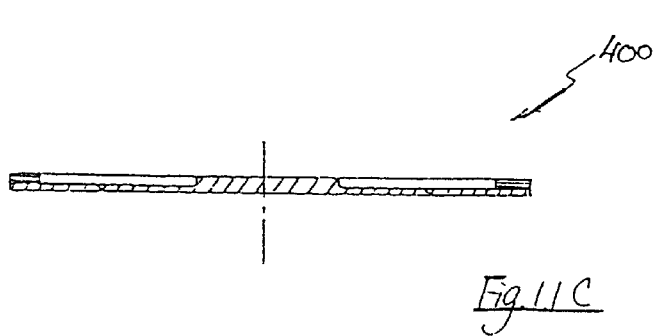
FIG. 11C is a sectional view taken along the line N—N in FIG. 11A.
Figure 12A:
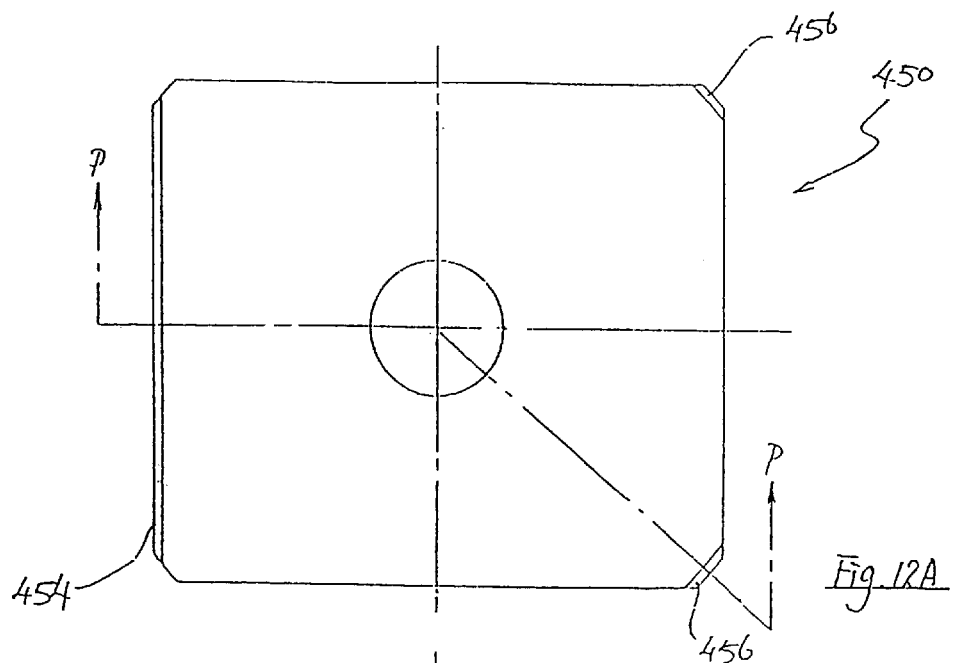
FIG. 12A is a top view of a CD engageable with the CD holder shown in FIG. 10.
Figure 12B:
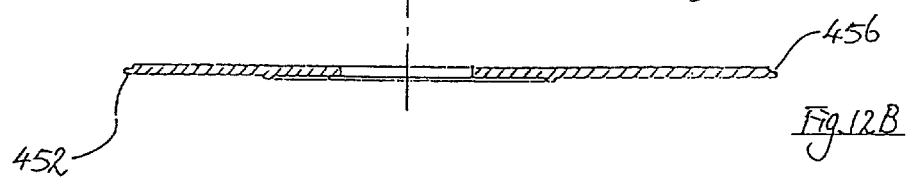
FIG. 12B is a sectional view taken along the line P—P in FIG. 12A.
Figure 12C:
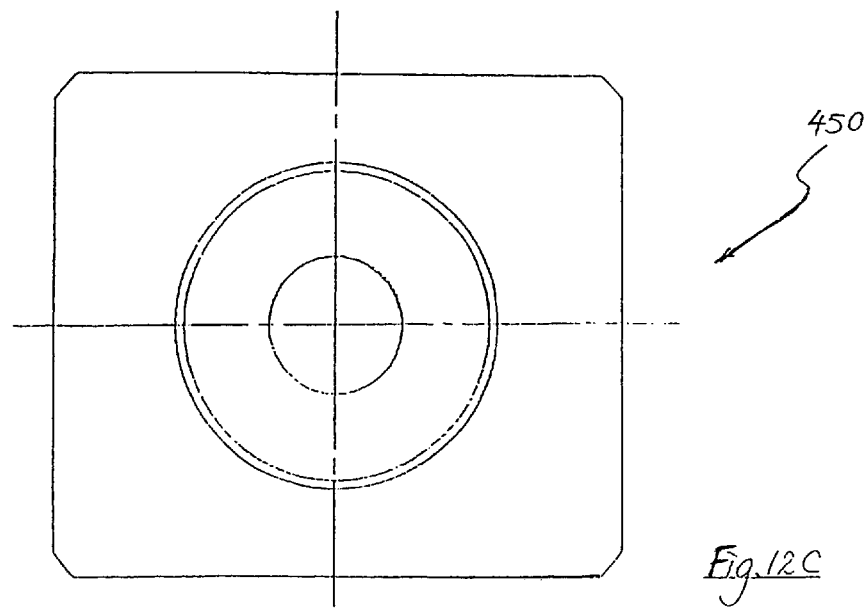
FIG. 12C is a bottom view of the CD shown in FIG. 12A.
Figure 12D:
FIG. 12D is a right side view of the CD shown in FIG. 12A.

FIGS. 10 to 11C show a fourth embodiment of a holder according to the present invention, generally designated as 400. This holder 400 is similar in shape and structure to the holder 300 discussed above. The holder 400 also has a wider raised platform 402 with an inner side 404. The main difference between the holder 300 and the holder 400 is that while the inner side 306 of the holder 300 has a planar surface which is perpendicular to a planar surface 310 of the holder 300, the inner side 404 of the holder 400 is provided with a straight continuous under-cut portion 406, which may be seen more clearly in FIG. 11B. Two inwardly-inclined under-cut portions 408 are provided at the ends of an inner side 410 of a narrower raised platform 412.

FIGS. 12A to 12D show a CD, generally designated as 450, suitable for engagement with the holder 400 discussed above. Along one edge of the CD 450 is provided a straight stepped portion 452 with a lower stepped portion 454 which may be received within the under-cut portion 406 of the holder 400. At each of the ends of the edge opposite to the stepped portion 452 is provided a chamfered portion 456, which may be received within the under-cut portions 408 of the holder 400.

To engage the CD 450 with the holder 400, the lower stepped portion 454 is first inserted into the straight continuous under-cut portion 406. The chamfered portions 456 are then snap-fitted into the under-cut portions 408 of the holder 400. To disengage the CD 450 from the holder 400, the chamfered portions 456 are snapped out of engagement with the under-cut portions 408. The lower stepped portion 454 may then be removed from the under-cut portion 406 to disengage the CD 450 from the holder 400.

Figure 14A:
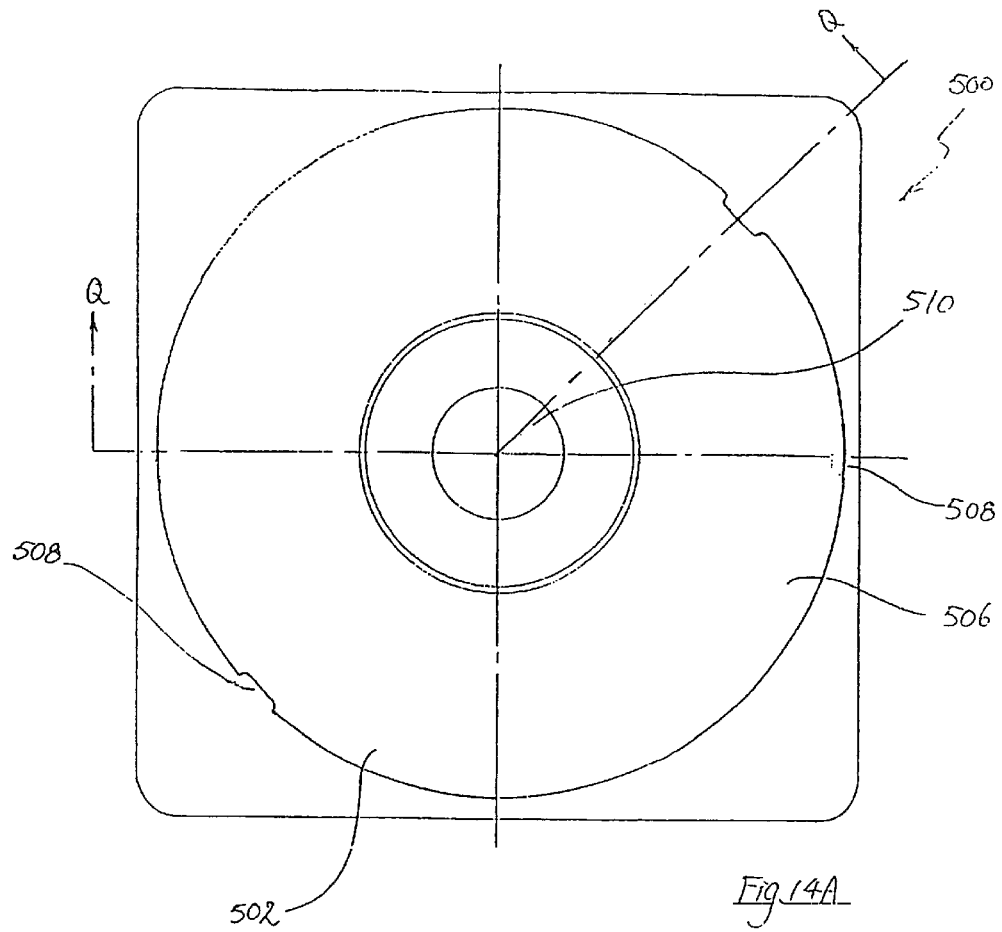
FIG. 14A is a top view of the CD holder shown in FIG. 13.
Figure 14B:
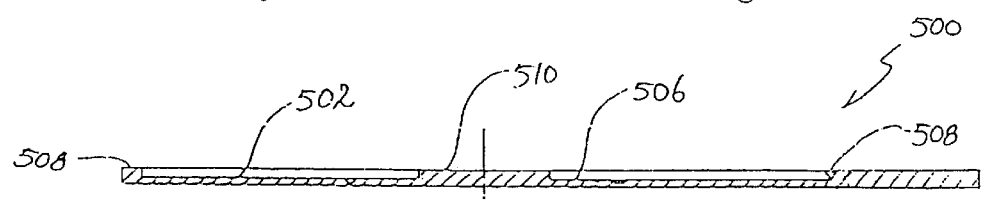
FIG. 14B is a sectional view taken along the line Q—Q in FIG. 14A.

A fifth embodiment of a holder according to the present invention is shown in FIGS. 13 to 14B, and generally designated as 500. The holder 500 is generally square in shape, with a central generally circular lowered portion 502 for receiving a CD, to be discussed below. The lower portion 502 has a continuous circular side wall 504 which is perpendicular to a base surface 506 of the holder 500, except two lock portions 508 which are arranged along the circular side wall 504 and diametrically opposite each other. As can be seen more clearly in FIG. 14B, each of the lock portions 508 has a surface which is inwardly inclined relative to the base surface 506 of the holder 500.

Figure 15A:
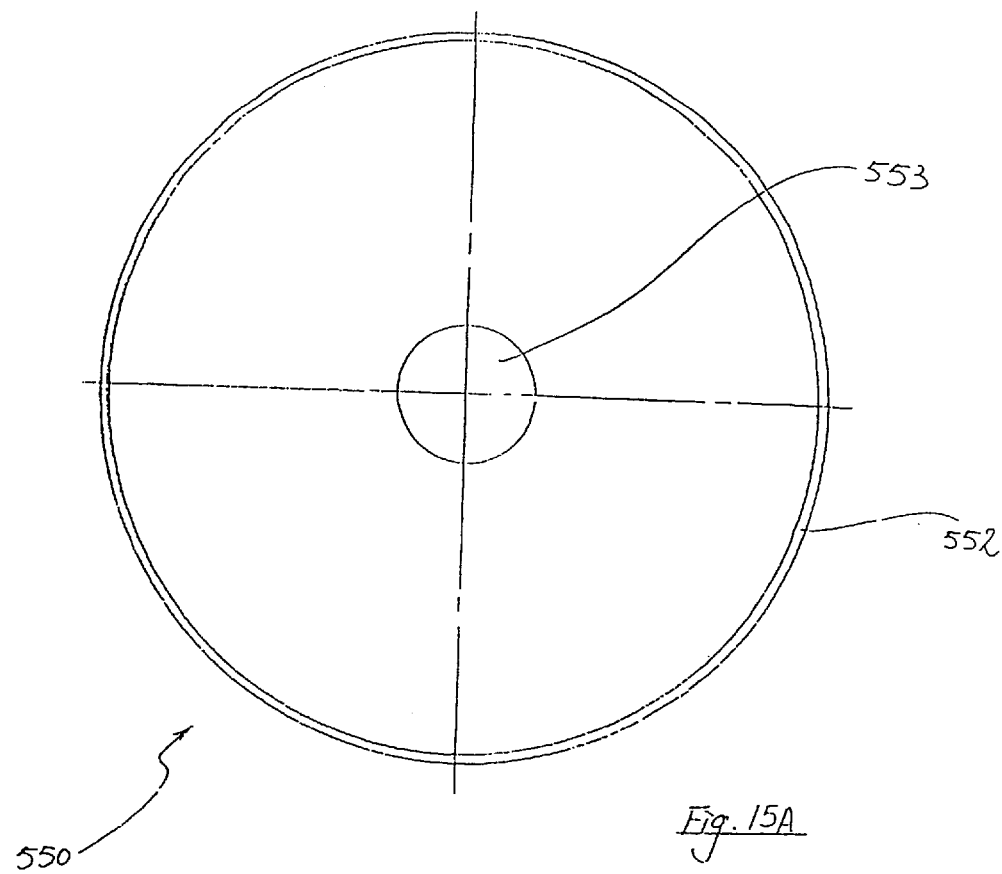
FIG. 15A is a top view of a CD engageable with the CD holder shown in FIG. 13.
Figure 15B:
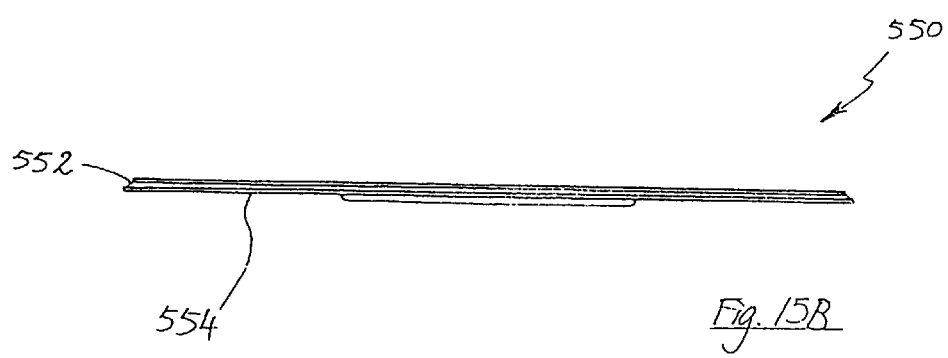
FIG. 15B is a side view of the CD shown in FIG. 15A.

A CD suitable for engagement with the holder 500 is shown in FIGS. 15A and 15B, and generally designated as 550. The CD 550 is circular in shape, and has a chamfered peripheral edge 552. To engage the CD 550 with the holder 500, the CD 550 is placed above the holder 500, with a central rigid circular peg 510 of the holder 500 received partly within a central hole 553 of the CD 550, and with an under surface 554 facing the base surface 506 of the holder 500. The chamfered edge 552 of the CD 550 is then snap-fitted with the lock portions 508, to secure the CD 550 with the holder 500. To disengage the CD 550 from the holder 500, the chamfered edge 552 of the CD 550 is snapped out of engagement with the lock portions 508 of the holder 500.

Figure 16A:
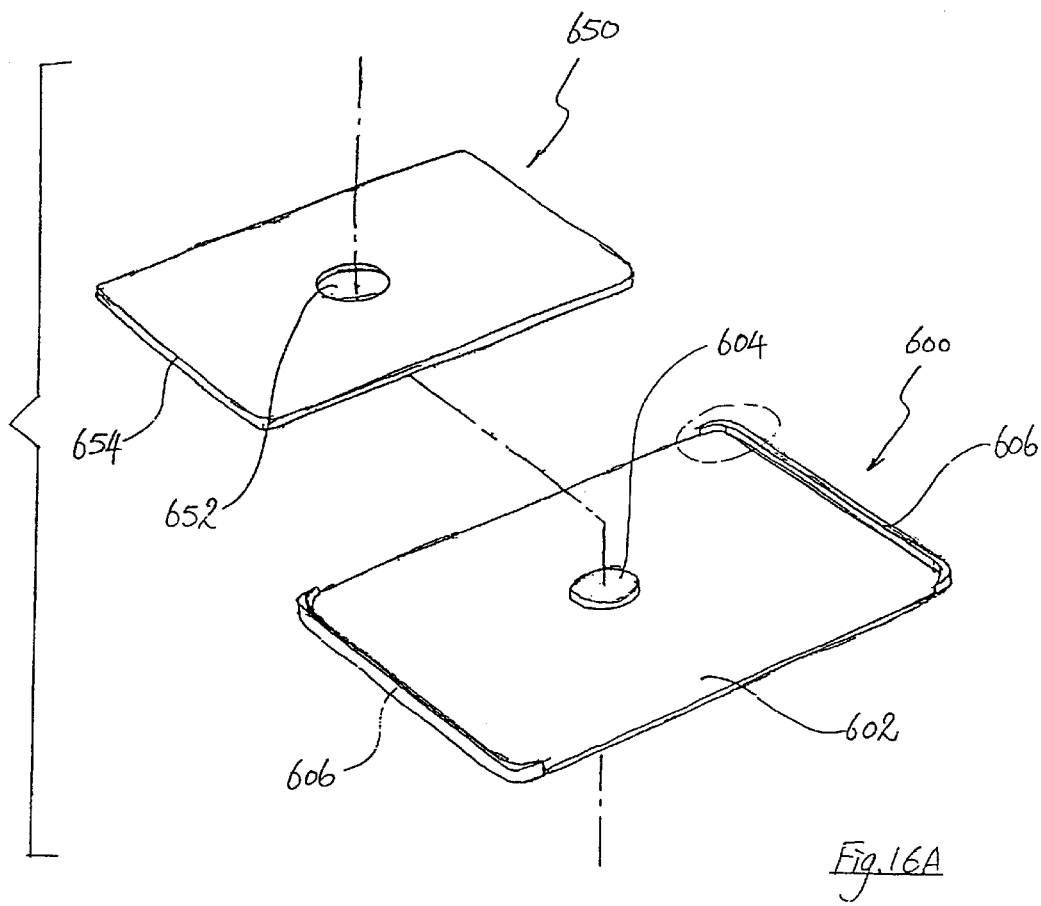
FIG. 16A shows a sixth embodiment of a holder for an optically readable information disc according to the present invention, and a CD engageable therewith.
Figure 16B:
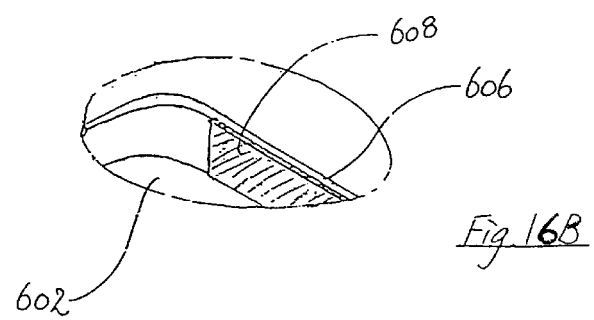
FIG. 16B is an enlarged view of the part encircled in FIG. 16A.

FIG. 16A shows a sixth embodiment of a holder according to the present invention, generally designated as 600, and a CD 650 suitable for engagement with the holder 600. The holder 600 is generally rectangular in shape with a planar base surface 602. A peg 604 is provided at the centre of the surface 602, and is sized and configured to be received within a hole of a CD, to be discussed below. At each shorter side of the holder 600 is a raised wall 606, which runs along the entire length of the shorter side of the holder 600 and across the two adjoining corners. Provided on the insider surface of the wall 606 is a friction pad 608, which may be made of polyfoam, silicon, natural rubber and synthetic rubber, etc.

The CD 650 corresponds in shape to the surface 602 of the holder 600, and has a central hole 652 for receiving the peg 604 of the holder 600. When the CD 650 is engaged with the holder 600, the friction pad 608 tends to retain the CD 650 in the engaged position by reason of the frictional force between the pad 608 and a respective side surface 654 of the CD 650. In this connection, in order to enhance the engagement between the CD 650 and the holder 600, the peg 604 of the holder 600 may also be made of polyfoam, silicon, natural rubber and synthetic rubber, etc.

Figure 18:
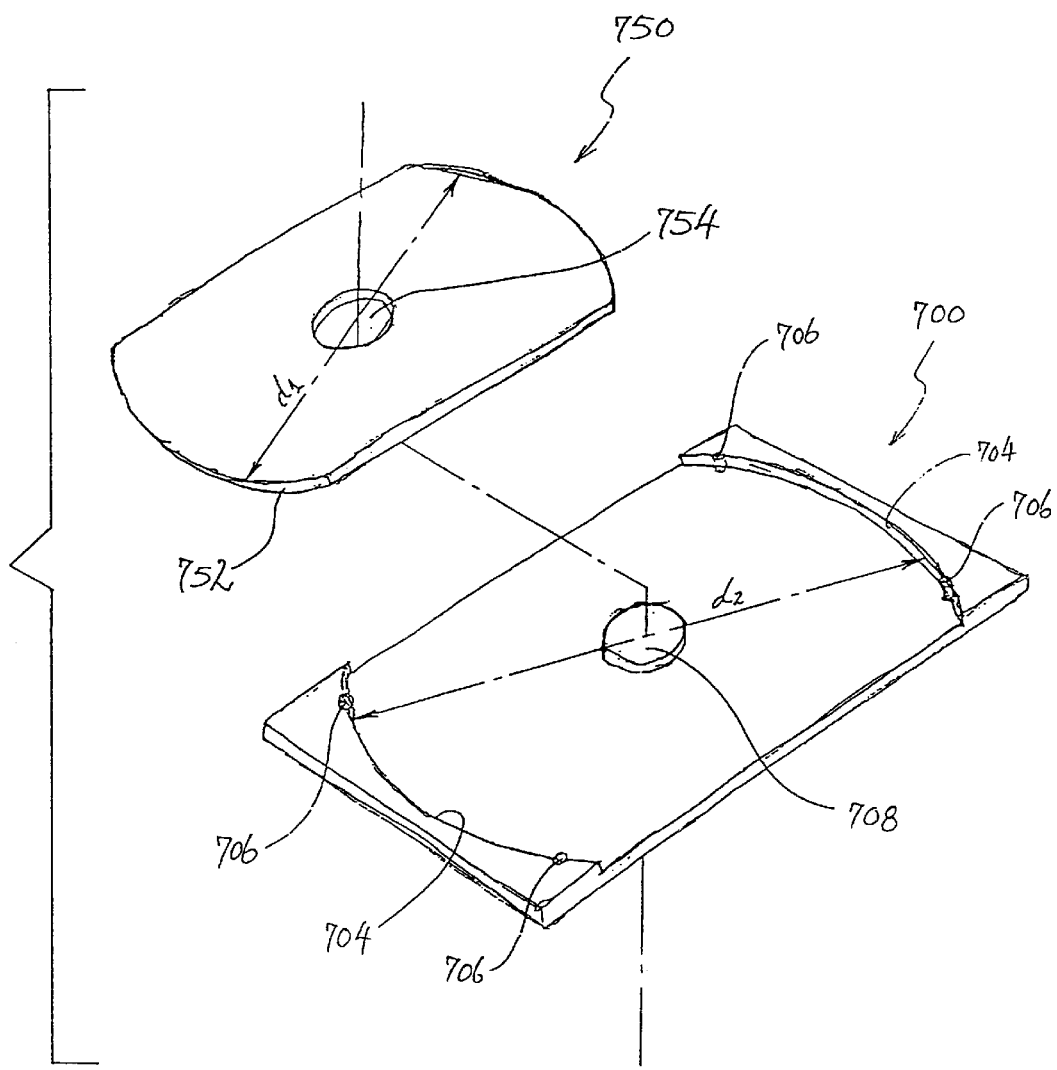
FIG. 18 shows the seventh embodiment of a holder for an optically readable information disc shown in FIG. 17, and a CD engageable therewith.

A seventh embodiment of a holder according to the present invention is shown in FIGS. 17 and 18, and generally designated as 700. Also shown in FIG. 18 is a CD 750 which may be engaged with the holder 700. The generally rectangular holder 700 has two raised platforms 702, each on one longitudinal end thereof. On an curved inner side 704 of each platform 702 are two friction pins 706, which engage a curved peripheral edge 752 of the CD 750. The two curved inner sides 704 of the holder 700 are arcs of a circle with the centre being the centre of a peg 708 of the holder 700. The curved peripheral edges 752 of the CD 750 are also arcs of a circle with the centre being the centre of a hole 754 of the CD 750. The radius of curvature of the curved inner sides 704 and that of the peripheral edges 752 are the same, and the distances $d_1$ and $d_2$ as shown in FIG. 18 are the same. With such an arrangement, when the peg 708 is received within the hole 754, the CD 750 may be rotated relative to the holder 700 into or out of engagement with the friction pins 706, so as to be engaged with or disengaged from the holder 700.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

What is claimed is:

1. A holder for holding at least one optically readable information disc, wherein said holder includes an engagement mechanism including at least one undercut portion adapted to releasably receive at least part of an outer peripheral edge of said disc, and wherein a continuous, flush, and planar upper surface is adapted to be formed when said holder is engaged with said disc.

2. A holder according to claim 1 further including a rigid peg member adapted to be received within a hole of said disc.

3. A holder according to claim 2 wherein said peg member includes a continuous upper surface.

4. A holder according to claim 1 further including a substantially planar surface having a circular trough member and at least a protruding member extends from said trough member above said planar surface.

5. A holder according to claim 4 wherein at least two protruding members extend from said trough member.

6. A holder according to claim 5 wherein said at least two protruding members on said trough member are substantially diametrically opposite to each other.

7. A holder according to claim 1 further including at least two oppositely facing under-cut portions.

8. A holder according to claim 1 further including at least four under-cut portions.

9. A holder according to claim 1 wherein said holder is adapted to be engaged with said disc in a snap fit manner.

10. A holder according to claim 1 wherein said disc is rotatably movable relative to said holder between a first position in which disengagement of said disc from said holder is prevented and a second position in which disengagement of said disc from said holder is allowed.

11. A holder according to claim 1 wherein said engagement mechanism comprises at least a surface made of a material selected from a group consisting of polyfoam, silicon, natural rubber and synthetic rubber.

12. A holder for holding at least one optically readable information disc, wherein said holder includes an engagement mechanism that includes at least a surface including at least a pin member adapted to releasably engage with at least part of an outer peripheral edge of said disc, and wherein a continuous, flush, and planar upper surface is adapted to be formed when said holder is engaged with said disc.

13. A holder according to claim 12 wherein said engagement mechanism is adapted to releasably engage with at least part of a peripheral edge of said disc by means of friction fit.

14. A holder according to claim 12, wherein said engagement mechanism includes two oppositely facing surfaces, each including at least two said pin members.

* * * * *